April 30, 1929.  T. B. SMITH  1,711,331
LIQUID DISPENSING APPARATUS
Filed Oct. 21, 1926  2 Sheets-Sheet 1

INVENTOR
Thomas B. Smith
BY
ATTORNEY

April 30, 1929.  T. B. SMITH  1,711,331
LIQUID DISPENSING APPARATUS
Filed Oct. 21, 1926  2 Sheets-Sheet 2
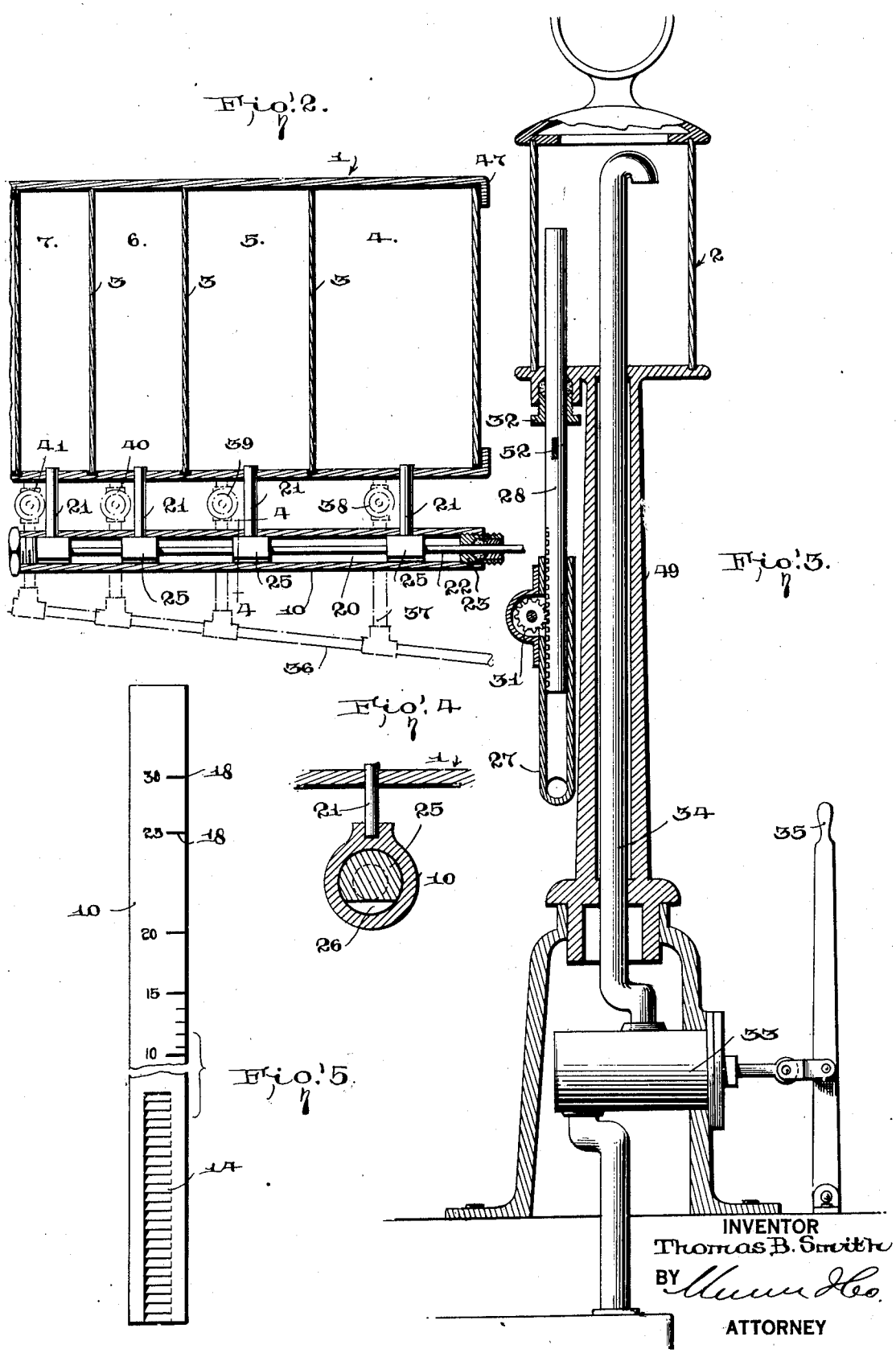
INVENTOR
Thomas B. Smith
BY
ATTORNEY Patented Apr. 30, 1929.

1,711,331

UNITED STATES PATENT OFFICE.

THOMAS BROUGHTON SMITH, OF PINEWOOD, SOUTH CAROLINA.

LIQUID-DISPENSING APPARATUS.

Application filed October 21, 1926. Serial No. 143,215.

This invention relates to improvements in liquid dispensing apparatuses, an object being to provide a novel arrangement for measuring and dispensing certain liquids, for example gasoline and oil, there being provision for computing or determining the quantity of liquid to be dispensed for given amounts of money, the fluctuations in the prices of such liquids being taken into account.

Another object of the invention is to provide an apparatus of the character described adapted particularly for use at the familiar gasoline filling stations, there being an arrangement whereby various quantities of gasoline are stored in readiness for immediate dispensation, thus facilitating purchases both from the standpoint of the vendor and the buyer.

Other objects and advantages will appear in the following specification, reference being had to the accompanying drawings, in which, Figure 1 is a perspective view of the improved dispensing apparatus.

Figure 2 is a longitudinal section of the fractional dispensing tank.

Figure 3 is a vertical section of the main standard and bulk dispensing tank.

Figure 4 is a detailed cross section on the line 4—4 of Figure 2.

Figure 5 is a detailed view of the graduated overflow pipe of the fractional dispensing tank.

Figure 1:
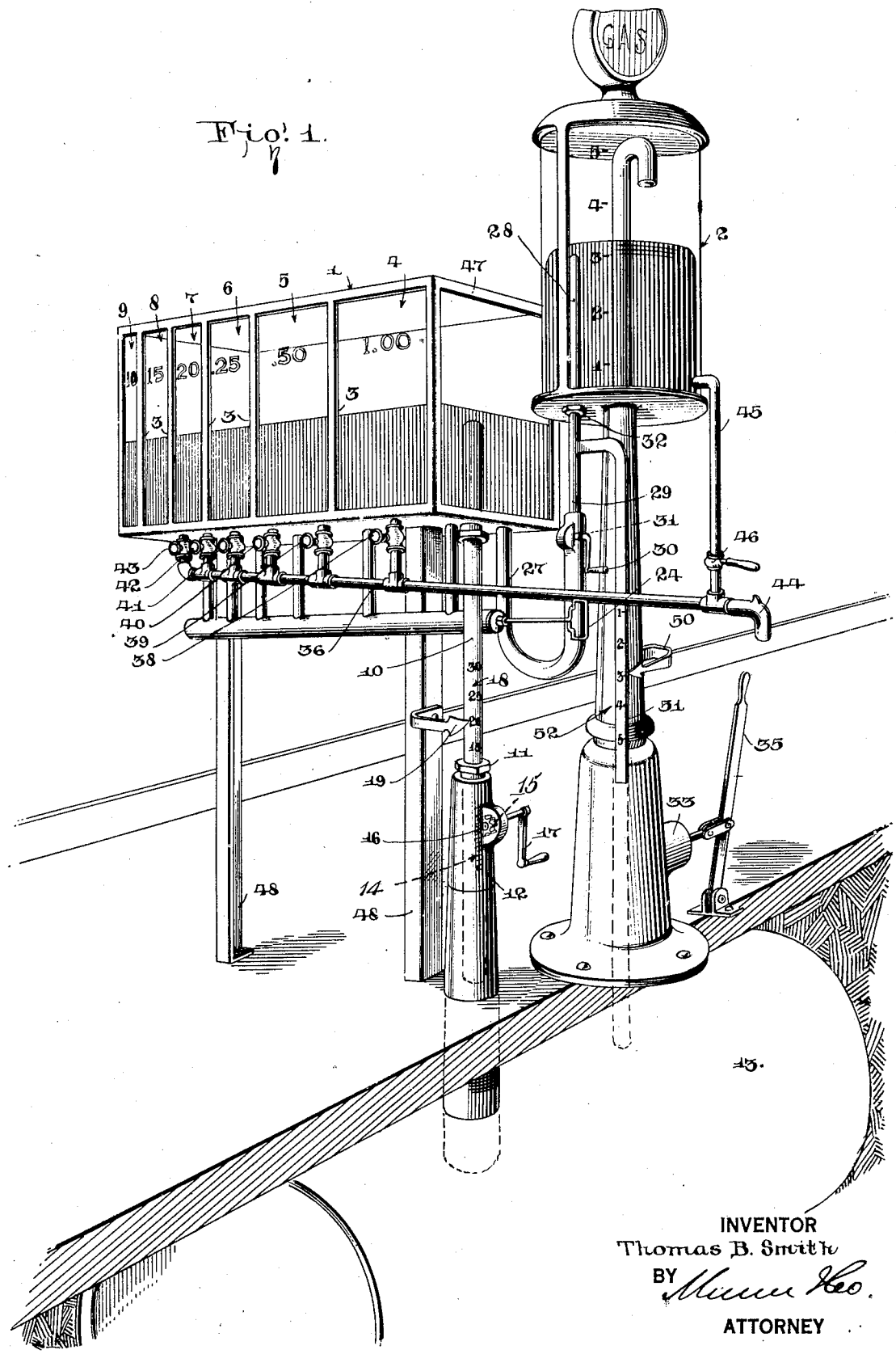

As already briefly stated, it is one of the objects of the invention to make possible the more convenient dispensation of gasoline at filling stations, but while the description of the invention is confined to this particular use it must be understood that the apparatus may be employed to equally good advantage in dispensing other liquids. It is now the universal custom to sell gasoline in gallon (and perhaps also quarts) quantities regardless of fluctuating prices.

If gasoline is retailing at 27¢ per gallon and the customer has only $1 to invest, he would be told that three gallons would amount to 81¢. In this case the seller is compelled to delay both the immediate buyer as well as waiting buyers until he obtains the necessary change of 19¢. If the customer had had 8¢ more he could have purchased four gallons of gasoline which, at the price of 27¢ per gallon would have cost him $1.08.

No provision seems to be made in the present dispensing apparatuses for accurately measuring exactly $1's worth of gasoline regardless of fluctuations in the price per gallon thereof, but to do this accurately and conveniently is one of the objects of the invention. Provision is also made for selling proportionate quantities of gasoline for smaller amounts of money, for example 50¢, 25¢ etc.

Reference is made to the drawings. As is seen in Figure 1, the apparatus comprises two principle gasoline containers 1 and 2, these being herein known as the fractional dispensing tank and the bulk dispensing tank, respectively. The first of these tanks is divided by a plurality of partitions 3 to form gasoline compartments 4, 5, 6, 7, 8 and 9 of progressively smaller capacity and thereby to contain progressively smaller volumes of gasoline. The various compartments are labeled to indicate the price of the particular quantity of gasoline contained thereby.

For example, the first compartment 4 carries the legend $1.00, the second the legend 50¢ and so on. The quantity of gasoline contained by the various compartments is regulated by the height of an overflow pipe 10.

This pipe extends into the compartment 4. It also passes through a suitable gland 11 at the upper end of a stand pipe 12 which communicates with an underground storage tank 13. The pipe 10 is formed with a rack 14 (Figure 5) with which a pinion 15 meshes. The pinion is contained by a sufficiently large casing 16 formed on the side of the stand pipe 12, there being a crank 17 on the extended shaft of the pinion to permit turning of the pinion and so moving the overflow pipe 10 up and down. This action changes the elevation of the upper end of the pipe in respect to the bottom of the tank 1, the pipe being graduated at 18 to cooperate with a fixed pointer 19 to provide an index.

The graduations 18 are numbered to indicate the current or market price of the particular liquid, in this case gasoline. In Figure 1 the pointer 19 registers with the graduation "20", thus indicating that the current price of gasoline is 20¢ per gallon. The position of the upper end of the pipe 10 within the tank 1 is such that the compartment 4 will contain five gallons of gasoline before an overflow into the pipe occurs, therefore if the customer wishes to buy $1's worth of gasoline the attendant so operates the apparatus that the contents of compartment 4 are dispensed. The same principle prevails in respect to the compartment 5 and the remaining compartments. The former will contain the appropriate quantity of gasoline to be dispensed if the purchaser wishes to buy 50¢ worth.

Provision for filling the various compartments of the tank 1 is made in this manner: A valve casing 20 (Figure 2) has connection with each of the compartments by means of short pipes 21. A valve rod 22 is capable of sliding in one end closure 23 of the valve casing, and for the purpose of sliding the valve rod the exposed end thereof carries a suitable handle 24. The valve rod has a plurality of substantially cylindrical valve members 25 formed thereon, these being cut away on the under side as at 26 (Figure 4) to provide fluid passages when the valve members 25 are moved out of closing position beneath the pipes 12 and 21.

In other words, if it be desired to fill the various compartments 4, 5, etc., the valve handle 24 is pulled out (Figure 1) whereupon the valve members 25 will take up a position at one side of the pipes 21. The cut away portions 26 then afford communication between the various compartments through the valve casing 20 so that incoming gasoline may reach a common level in all of the compartments.

Gasoline is caused to flow into tank 1 in this manner: A suitably supported and substantially U-shaped inlet pipe 27 communicates at one end with the compartment 4 (Figures 1 and 2) and the other end is enlarged sufficiently to receive the lower end of the overflow pipe 28 of the bulk dispensing tank 2. This pipe, like the pipe 10, will be provided with a rack 29 so that turning of the crank 30 will cause the engaging pinion 31 to move the pipe up and down within the tank 2. The pipe slides in a suitable gland 32 in the bottom of the tank.

A pump 33 delivers the gasoline to the tank 2 by way of a pipe line 34 which connects the dispensing tank 2 with the underground storage tank 13. The lever 35 of the pump is operated to fill the tank 2. Assuming the valve handle 24 to have been pulled out, as stated above, the gasoline which overflows into the pipe 28 from the tank 2 will enter the compartment 4 as well as the remaining compartments by virtue of the communication afforded by the particular construction of the valve members 25.

Dispensation of gasoline from the fractional tank 1 is effected in this manner: A discharge pipe 36 has connection with each of the various compartments by means of pipes 37, the various pipes being equipped with valves 38, 39, 40, 41, 42 and 43 so that an immediate control of any one of the compartments may be had. For example, closure of all of the valves excepting valve 38 will permit the dispensation of the contents of compartment 4 only. Or, closure of all of the valves excepting valve 39 will permit the dispensation of the contents of compartment 5 only, and so on. The discharge pipe 36 terminates in a nozzle 44 which may, in turn, be equipped with the familiar filling hose. A connection 45, provided with a valve at 46, permits the dispensation of quantities of gasoline from the dispensing tank 2.

This tank may be used at times. There may be some purchasers who may desire to buy given quantities of gasoline regardless of changes in the price per gallon. To use the example already given, the purchaser may desire to buy 3 gallons at 27¢ per gallon, amounting to 81¢ rather than to invest $1 and thus obtain the slightly additional quantity contained by the compartment 4.

Any appropriate supporting structure may be employed for the tanks 1 and 2 and the structure of the tanks themselves may be subject to considerable modification. It is preferable that each be partly made of glass so that the gasoline can be seen. The tank 1 includes a framework 47 which has supports 48 resting upon the ground. The tank 1 may be made by cementing panes of glass in the framework 47. Each compartment 4, 5, etc. is separate and non-communicating excepting through valve casing 20. A standard 49 supports the bulk dispensing tank 2. The standard contains the pipe line 34 and carries the pump 33 in any suitable manner.

Gauge means associated with the pipe section 28 enables the attendant to accurately determine the position of the upper end of the section within the tank 2 so that unit-volumes of gasoline may be stored therein preparatory to the selling thereof. This gauge means comprises a fixed pointer 50, and a rod or bar 51 depending from the section 28, and provided with appropriate graduations 52 for co-action with the pointer.

The operation may be readily understood. Assume first that the purchaser wishes to buy $1's worth of gasoline. The current price per gallon is known to be 20¢ and by proper operation of the crank 17 the attendant will have moved the overflow pipe 10 until the pointer 19 registers with the graduation "20". This act elevates the upper end of the overflow pipe a certain distance above the bottom of the tank 1. The tank is supposed to have been previously filled so that the gasoline stands at the same level in all of the compartments 4, 5, etc.

The proportions of the compartments are such that they will hold proper quantities of gasoline to agree with various prices per gallon. The compartment 4 will hold five gallons at the current price of 20¢ per gallon. Should the current price happen to drop to 15¢, the action of the crank 17 will elevate the pipe 10 so that an increased quantity of gasoline will be dispensed for the $1.

The attendant now opens the valve 38, the remaining valves being left closed. The gasoline from compartment 4 flows into the discharge pipe 36 and so out of the nozzle 44. Should the purchaser desire to buy 50¢ worth of gasoline, all valves are closed excepting 39, whereupon a similar action will take place.

If, as previously stated, the purchaser desires to buy a given number of gallons of gasoline regardless of what the current price may be, the attendant will set the overflow pipe 28 to the proper height within the tank 2 so that the tank will be filled with the desired number of gallons before the valve 46 is opened. The apparatus is intended to facilitate the purchase and dispensation of gasoline. It is only necessary that the purchaser have ready the required amount of money he wishes to invest whereupon the proper amount of gasoline can be dispensed immediately.

While the constructions and arrangements of the improved liquid dispensing apparatus are that of a generally preferred form, obviously modifications and changes may be made without departing from the spirit of the invention or scope of the claims.

What I claim is:

1. Dispensing apparatus comprising a tank, means for introducing liquid into the tank, partitions dividing the tank into a plurality of compartments, and simultaneously operable means by which all of the compartments may be placed in communication irrespective of the quantity of liquid insuring a common liquid level in all of the compartments.

2. Apparatus for dispensing variable quantities of liquid determined by the current price per unit-volume thereof comprising a tank, partitions to divide the tank into progressively smaller compartments, means by which all of the compartments may be placed in communication with each other, means to introduce liquid into the tank, said liquid rising to a common level in all of the compartments by virtue of the foregoing means, an overflow pipe, an index with reference to which the overflow pipe is adjusted according to current prices per unit-volume of the liquid thus determining the quantity of liquid in each compartment to be dispensed for fixed prices identified with the various compartments, a discharge pipe common to all of the compartments, and individual valve means by which any one of the compartments may be drained into the discharge pipe.

3. Dispensing apparatus comprising a tank, partitions fixed in the tank dividing it into a plurality of progressively smaller compartments each being representative of determined money values, means to introduce liquid into the tank, a multiple valve arrangement including pipes by which it is connected with all of the compartments, an overflow pipe extending into one of the compartments permitting all of the compartments to fill to the level of the overflow pipe, said overflow pipe being graduated to indicate current prices per unit-volume of the liquid to be dispensed, a fixed pointer, and means to adjust the overflow pipe in reference to the pointer thus determining the level of the liquid within the tank and the quantity in each compartment for dispensation.

4. Dispensing apparatus comprising a tank, partitions arranged within the tank dividing it into a plurality of progressively smaller compartments representative of determined money values, a multiple valve arrangement common to each of the compartments and comprising a valve casing having pipe connections with each compartment, connected and movable valve members within the casing being shiftable to either close the connections or open them so that communication in all of the compartments may be had, means to introduce liquid into the tank, an overflow pipe extending into one of the compartments, said overflow pipe having graduations marked with current prices per unit-volume of the liquid, a fixed pointer, and means to adjust the overflow pipe in respect to the pointer and to the bottom of the tank thereby varying the level of the upper end of the pipe according to fluctuations in said prices thereby varying the quantity of liquid in each compartment to be dispensed for said money value thereof.

5. Dispensing apparatus comprising a tank, partitions arranged within the tank dividing it into a plurality of progressively smaller compartments representative of determined money values, a multiple valve arrangement common to each of the compartments and comprising a valve casing having pipe connections with each compartment, connected and movable valve members within the casing being shiftable to either close the connections or open them so that communication in all of the compartments may be had, means to introduce liquid into the tank, an overflow pipe extending into one of the compartments, said overflow pipe having graduations marked with current prices per unit-volume of the liquid, a fixed pointer, means to adjust the overflow pipe in respect to the pointer and to the bottom of the tank thereby varying the level of the upper end of the pipe according to fluctuations in said prices thereby varying the quantity of liquid in each compartment to be dispensed for said money value thereof, a common discharge pipe, and valved connections between each of the compartments and said pipe.

6. Dispensing apparatus comprising a tank, partitions dividing the tank into a plurality of progressively smaller compartments representative of fixed money values, means associated with said tank for fixing the level of the liquid in said compartments to agree with changing prices per unit-volume of liquid, a second tank, means to introduce liquid into said second tank, an inlet pipe connecting the first and second tanks and including a section which is adjustable in respect to the second tank to measure unit-volumes of liquid therein regardless of changing prices, a discharge pipe arrangement common to both tanks, and independent valve means in said pipe arrangements for either draining said compartments or said second tank.

7. Dispensing apparatus comprising a pair of tanks, piping connecting the tanks being the inlet for one of the tanks and inculding a pipe section extending into the other tank in respect to which it serves as an overflow, means to move said section and means to determine the position of the end of said section in said other tank for the storage therein of unit-volumes of liquid, partitions dividing the first one of the tanks into a plurality of compartments of progressively smaller size, means to introduce liquid into said second tank until the overflow enters said connecting piping, valve means placing the compartments into communication, and an adjustable overflow pipe extending into one of the compartments determining the level of liquid in said first tank.

8. Dispensing apparatus comprising a tank, partitions dividing the tank into compartments, an overflow pipe, and a valve arrangement operable to simultaneously place each of the compartments in communication at the bottom resulting in a level of liquid common with the end of the pipe in all of the compartments.

9. Dispensing apparatus comprising a tank, partitions dividing the tank into compartments, means by which any one of the compartments may be drained, and means for simultaneously placing all of the compartments in communication at the bottom enabling the establishment of a common liquid level in all of the compartments after any compartment has been drained.

THOMAS BROUGHTON SMITH.